United States Patent [19]

Rodgers

[11] 4,082,079
[45] Apr. 4, 1978

[54] PORTABLE SOLAR OVEN AND GRILL

[75] Inventor: John Rodgers, Somerdale, N.J.

[73] Assignee: The Raymond Lee Organization, Inc., New York, N.Y.

[21] Appl. No.: 660,710

[22] Filed: Feb. 23, 1976

[51] Int. Cl.² ............................................. F24J 3/02
[52] U.S. Cl. .................................................... 126/270
[58] Field of Search ................ 126/270, 271, 218, 216

[56] References Cited
U.S. PATENT DOCUMENTS

| 1,158,175 | 10/1915 | Cherrier | 126/270 |
|---|---|---|---|
| 3,023,753 | 3/1962 | Wheless | 126/270 |
| 3,038,463 | 6/1962 | Daymon | 126/270 |
| 3,106,201 | 10/1963 | Steinberg | 126/270 |
| 3,938,497 | 2/1976 | Andrassy | 126/270 |

Primary Examiner—John J. Camby
Assistant Examiner—Larry I. Schwartz
Attorney, Agent, or Firm—Howard I. Podell

[57] ABSTRACT

A portable oven and grill heated by solar energy, which is fabricated of lightweight materials. The oven box is formed of a shaped open diagonal box, the walls of which are heat insulators, finished on their inner surfaces with a black matte surface to absorb radiated heat. Vanes formed of insulated panels coated on their upper sides with aluminum foil to reflect radiation are mounted along the top of each edge of the oven box and oriented at an obtuse angle to the vertical inner walls of the oven box. A glass panel is mounted across the open face of the oven box, which is inclined at an angle to horizontal bottom base wall of the oven, to retain the heat inside the oven compartment. A slidable metal grill plate is mounted to the inner bottom base wall so as to slide part ways out of the rear side of the oven wall while remaining in contact with an aluminum plate loosely mounted to the inner base bottom wall so as to be heated, for grilling purposes, when so extended out of the side wall.

1 Claim, 3 Drawing Figures

PORTABLE SOLAR OVEN AND GRILL

SUMMARY OF THE INVENTION

My invention is a portable oven and grill heated by solar energy, which is fabricated of lightweight materials.

The oven box is formed of a shaped open diagonal box, the walls of which are heat insulators, finished on their inner surfaces with a black matte surface. Vanes formed of insulated panels coated on their upper sides with aluminum foil are mounted along the top of each edge of the oven box and oriented at an obtuse angle to the black vertical inner walls of the oven box. A glass panel is mounted across the open face of the oven box, which is inclined at an angle to horizontal bottom base wall of the oven, to retain the heat inside the oven compartment. A slidable metal grill plate is mounted to the inner bottom base wall so as to slide part ways out of the rear side of the oven wall while remaining in contact with an aluminum plate loosely mounted to the inner base bottom wall so as to be heated, for grilling purposes, when so extended out of the side wall.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
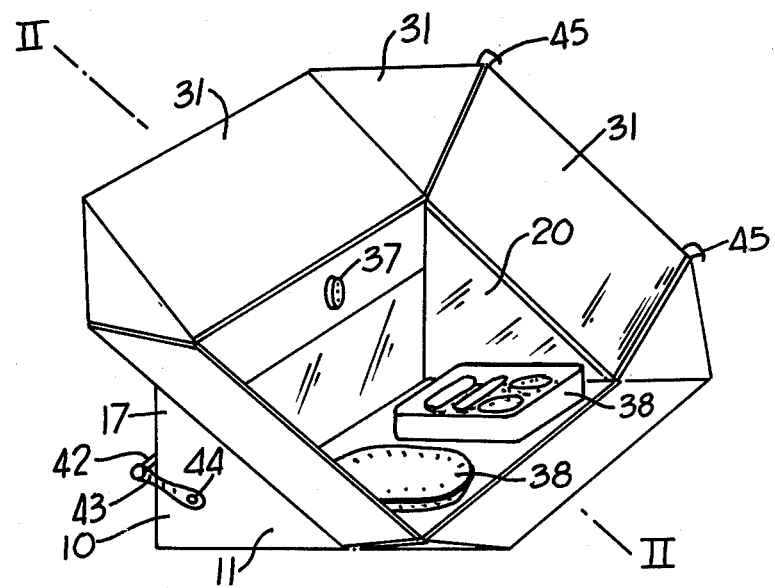
FIG. 1 is a perspective view of the invention in use as a solar oven.
Figure 2:
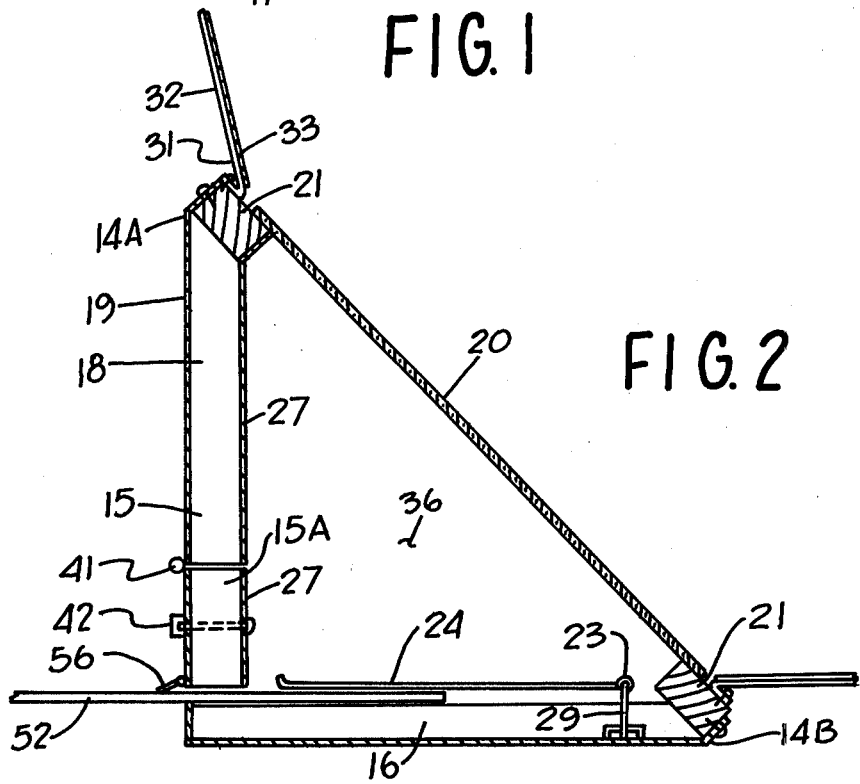
FIG. 2 is a sectional view taken along line II—II of FIG. 1.
Figure 3:
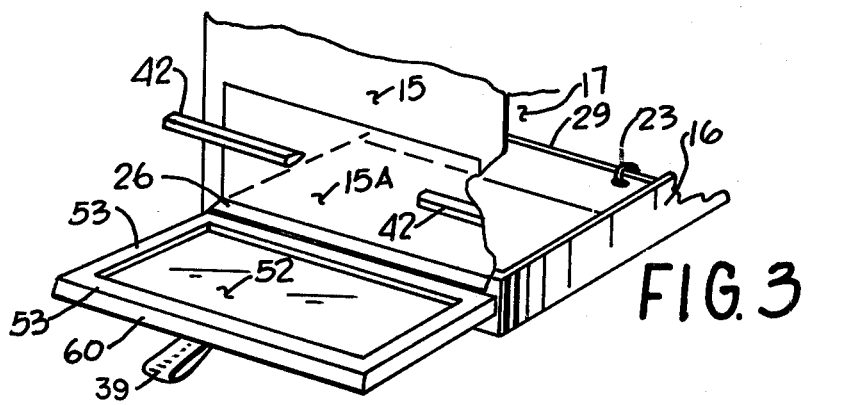
FIG. 3 is a rear fragmentary perspective view of the grill in the extended position.

Turning now descriptively to the drawings, in which similar reference characters denote similar elements throughout the several views, FIGS. 1-3 illustrate solar oven 10 which is formed in the shape of an open oven box 11 with a rectangular shaped vertical rear wall 15 joined to a horizontal rectangular bottom base plate 16 by side walls 17 that are each in the form of a right triangle. A glass plate 20 is mounted to a rectangular wooden frame 21 that is fixed by staples to the edges 14A, 14B and 14C of the oven box 11, being joined to the top edge 14A of the rear wall 15, the front edge 14B of the base plate 16 and to the upper diagonal edges of the side walls 17.

Each of the oven box walls 15, 17 and base plate 16 are formed of an outer shell 19 of corrugated cardboard fastened to a thick section of fiber glass insulation 18 with the inner faces of the insulation 18 of the walls 15 and 17 coated with a black matte finish 27. An interior aluminum base plate 24 is loosely hinged at its forward end 23 to a fastener 29 bolted to the forward section of the base plate 16.

Vanes 31 of corrugated cardboard 32 faced by aluminum foil 33 are fastened to the frame 21 so as to extend at an obtuse angle to the glass pane 20 all along the periphery of the frame 21. Vanes 31 reflect solar energy through the glass panel 20 which solar energy is trapped inside the interior 36 of the oven. A thermometer 37 may be mounted to an interior wall of the oven and plates 38, of food to be heated, may be placed on plate 24 which rests on the base panel 16, or on a grill plate 52 lying on base panel 16.

The rear wall 15 is formed with a door section 15A cut out of wall 15 and fastened by hinges 41 to the wall 15 for adding or removing plates 38 from the oven interior 36. One or more pegs 42 are fastened to the exterior of door section 15A to serve as handles and may be fastened with rubber bands 43 mounted to pegs 44 on walls 17 to hold door 15A in the closed position.

Vanes 31 may be clipped together by clips 45 to maintain them in the desired array.

A flap section 56 is hinged to the lower edge of door 15A to permit a grill assembly 60 to be slid part ways out of the oven interior so that food may be grilled on the metal plate 52 of the grill 60, with grill plate 52 extended out of the oven. Plate 52 is framed on its rear and sides by a wooden rail 53, with a strap 39 fastened to a rail 53. When partially extended out of the rear wall 15, grill plate 52 lies below and in contact with aluminum plate 24 resting on the hinge fastener 29 adjacent the base plate 16. Aluminum plate 24 heats grill plate 52 both in the extended use mode and retracted storage mode of plate 52.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An oven adaptable for utilization of solar energy for heating purposes, comprising an open box, the side walls and bottom wall of which bound a central heating chamber covered by a pane of glass, with the interior faces of the walls coated with a black finish, with one of said walls including a through slot therein to, together with a grill plate slidably mounted in said box adjacent said through slot of a size to slide through said slot, with means to heat said grill plate when the grill plate is partially extended through said slot so as to grill food on the portion of the grill plate lying exterior of the heating chamber, said means comprising a metal plate hinged to the interior of the box which rests on a section of the grill plate that lies within the box so as to heat the grill plate and the section of the grill plate extended beyond the confines of the box by solar energy falling on the hinged plate.

* * * * *